United States Patent [19]

Tajima

[11] Patent Number: 4,864,395
[45] Date of Patent: Sep. 5, 1989

[54] SIMPLIFIED CALIBRATION FOR A DISTANCE INFORMATION OBTAINING DEVICE

[75] Inventor: Johji Tajima, Tokyo, Japan

[73] Assignee: NEC Corporation, Tokyo, Japan

[21] Appl. No.: 229,460

[22] Filed: Aug. 8, 1988

[30] Foreign Application Priority Data

Aug. 6, 1987 [JP] Japan .................................. 62-195379

[51] Int. Cl.$^4$ ............................................. H04N 7/18
[52] U.S. Cl. ........................................ 358/107; 356/4; 364/561
[58] Field of Search ....................... 358/107; 356/4, 6; 364/561

[56] References Cited

U.S. PATENT DOCUMENTS

| | | | |
|---|---|---|---|
| 4,601,053 | 7/1986 | Grumet | 358/107 |
| 4,746,790 | 5/1988 | Sorimachi | 356/4 |
| 4,761,546 | 8/1988 | Ikari | 356/4 |
| 4,786,815 | 11/1988 | Walker | 356/4 |

FOREIGN PATENT DOCUMENTS 61-75210 4/1986 Japan .

OTHER PUBLICATIONS

Tajima, "Rainbow Range Finder Principle for Range Data Acquisition", International Workshop on Industrial Application of Machine Vision and Machine Intelligence, pp. 381–386, held by IEEE 1987.

Primary Examiner—Howard W. Britton
Attorney, Agent, or Firm—Foley & Lardner, Schwartz, Jeffery, Schwaab, Mack, Blumenthal & Evans

[57] ABSTRACT

In a distance information obtaining device comprising an image pickup device (10) for picking up an optical image of an object to produce a picture signal, and a signal processing unit (18) for processing the picture signal to produce a processed signal representative of distance information between the image pickup device and each point of the object, the signal processing unit produces a reference signal by using a reference picture signal derived from the image pickup device on a preliminary process. Responsive to the reference signal, a preliminary processing unit (26) preliminarily processes the reference signal to produce a preliminary processed signal as a calibration signal. In a measuring process, the signal processing unit processes the picture signal with reference to the preliminary processed signal. Preferably, the reference picture signal should be given in the form of first and second reference picture signals derived from first and second reference optical images of first and second reference plates (16) and (16') located at first and second distances ($Z_a$) and ($Z_b$) from the image pickup device.

4 Claims, 6 Drawing Sheets

| PRIMARY CELL DISTANCE $x_a$ | 1st REFERENCE LEVEL $I_{11}$ | 2nd REFERENCE LEVEL $I_{12}$ | 1st REFERENCE LEVEL RATE $R_1$ |
|---|---|---|---|
| -5 | 5 | 10 | 5/15 |
| -4 | 6 | 9 | 6/15 |
| -3 | 7 | 8 | 7/15 |
| -2 | 8 | 7 | 8/15 |
| -1 | 9 | 6 | 9/15 |
| 0 | 10 | 5 | 10/15 |
| 1 | 11 | 4 | 11/15 |
| 2 | 12 | 3 | 12/15 |
| 3 | 13 | 2 | 13/15 |
| 4 | 14 | 1 | 14/15 |
| 5 | 15 | 0 | 15/15 |

FIG.6

| SECONDARY CELL DISTANCE $x_b$ | 3rd REFERENCE LEVEL $I_{21}$ | 4th REFERENCE LEVEL $I_{22}$ | 2nd REFERENCE LEVEL RATE $R_2$ |
|---|---|---|---|
| -5 | 0 | 15 | 0 |
| -4 | 1 | 14 | 1/15 |
| -3 | 2 | 13 | 2/15 |
| -2 | 3 | 12 | 3/15 |
| -1 | 4 | 11 | 4/15 |
| 0 | 5 | 10 | 5/15 |
| 1 | 6 | 9 | 6/15 |
| 2 | 7 | 8 | 7/15 |
| 3 | 8 | 7 | 8/15 |
| 4 | 9 | 6 | 9/15 |
| 5 | 10 | 5 | 10/15 |

FIG.7

| $R_x$ | $a_R$ | $b_R$ | $\dfrac{1}{a_R^2+1}$ | $\dfrac{a_R b_R}{a_R^2+1}$ | $\dfrac{a_R}{a_R^2+1}$ | $\dfrac{b_R}{a_R^2+1}$ | $\dfrac{a_R^2}{a_R^2+1}$ |
|---|---|---|---|---|---|---|---|
| 5/15 | 1.471 | 300 | 0.3161 | 139.5 | 0.4650 | 94.83 | 0.6840 |
| 6/15 | 1.351 | 272 | 0.3540 | 130.1 | 0.4783 | 96.29 | 0.6461 |
| 7/15 | 1.250 | 250 | 0.3902 | 121.9 | 0.4878 | 97.55 | 0.6097 |
| 8/15 | 1.163 | 231 | 0.4251 | 114.2 | 0.4944 | 98.20 | 0.5750 |
| 9/15 | 1.064 | 215 | 0.4690 | 107.3 | 0.4990 | 100.8 | 0.5310 |
| 10/15 | 1.000 | 200 | 0.5000 | 100.0 | 0.5000 | 100.0 | 0.5000 |
| $\Sigma$ | | | 2.4544 | 713.0 | 2.9245 | 587.67 | 3.5458 |

FIG.8

| CELL DISTANCE $x$ | 1st LEVEL $I_1$ | 2nd LEVEL $I_2$ | LEVEL RATE $R_x$ | 1st FUNCTION $x_a(R)$ | 2nd FUNCTION $x_b(R)$ | $z_1$ (mm) |
|---|---|---|---|---|---|---|
| −5 | 3 | 12 | 3/15 | — | −2 | 231 |
| −1 | 7 | 8 | 7/15 | −3 | 2 | 231 |
| 5 | 13 | 2 | 13/15 | 3 | — | 231 |

FIG.9

SIMPLIFIED CALIBRATION FOR A DISTANCE INFORMATION OBTAINING DEVICE

BACKGROUND OF THE INVENTION

This invention relates to a distance information obtaining device for use in obtaining distance information for a robot arm or a magic hand.

A distance information obtaining device is disclosed in an article which is published by Johji Tajima, the instant applicant, under the title of "Rainbow Range Finder Principle for Range Data Acquisition" in "International Workshop on Industrial Application of Machine Vision and Machine Intelligence", pages 381 to 386, and which was held by IEEE on 1987. A range finder is used as the distance information device.

In order to deal with an object by using a robot arm, it is necessary to sense distance information from an observation position to each point on the object. The range finder is for obtaining the distance information by using a picture signal of the object. The range finder therefore comprises an image pickup device, such as a color television camera, which is located at the observation position. The image pickup device has a pickup axis directed towards the object. The image pickup device comprises first and second photoelectric transducers having first and second spectral sensitivities which are different from each other.

A diffraction grating is used in illuminating the object by a monochromatic beam of a wavelength $\lambda$. The diffraction grating is located at a grating position spaced apart from the observation position and has a normal directed towards the object. The monochromatic beam is projected onto a specific point of the object with a beam angle $\theta$ formed between the normal of the diffraction grating and the monochromatic beam. In other words, the monochromatic beam is projected onto the specific point at a first angle $\alpha$ with the pickup axis.

Towards the image pickup device, the specific point reflects the monochromatic beam as a reflected beam which forms a second angle $\beta$ with the pickup axis. The first and the second photoelectric transducers produce first and second picture signals in response to the reflected beam.

The range finder further comprises a processing unit for processing the first and the second picture signals. As will later be described more in detail, the first and the second picture signals are processed for searching the wavelength $\lambda$. The beam angle $\theta$ is decided in accordance with the wavelength $\lambda$ and is used for determining the first angle $\alpha$. A predetermined calculation is carried out by using information of the diffraction position and the first and the second angles $\alpha$ and $\beta$. The predetermined calculation is successively carried out as regards each picture element of the first and the second picture signals. In other words, the predetermined calculation is carried out for each point of the object. For this purpose, beams reflected at the respective points are picked up by the image pickup device.

The conventional range finder requires the information of the grating position and the first and the second angles as initial values. Furthermore, the initial values must be measured each time when the grating or the pickup device is subjected to failure and is changed to a new grating or pickup device.

SUMMARY OF THE INVENTION

It is therefore an object of this invention to provide distance information obtaining device which is capable to obtain distance information without measuring initial values.

A distance information obtaining device to which this invention is applicable is for use in obtaining distance information related to a distance between a predetermined position and an object. The distance information obtaining device comprises illuminating means for illuminating the object by a monochromatic beam, image pickup means located at the predetermined position for picking up an optical image of the object to produce a picture signal, and processing means coupled to the image pickup means for processing the picture signal to produce a processed signal.

According to an aspect of this invention, the processing means comprises reference signal generating means for generating a reference signal, preliminary processing means responsive to the reference signal for preliminarily processing the reference signal to produce a preliminary processed signal, and signal processing means responsive to said preliminary processed signal and said picture signal for processing the picture signal with reference to the preliminary processed signal to make the processed signal which represents the distance information.

DESCRIPTION OF THE PREFERRED EMBODIMENTS

Figure 1:
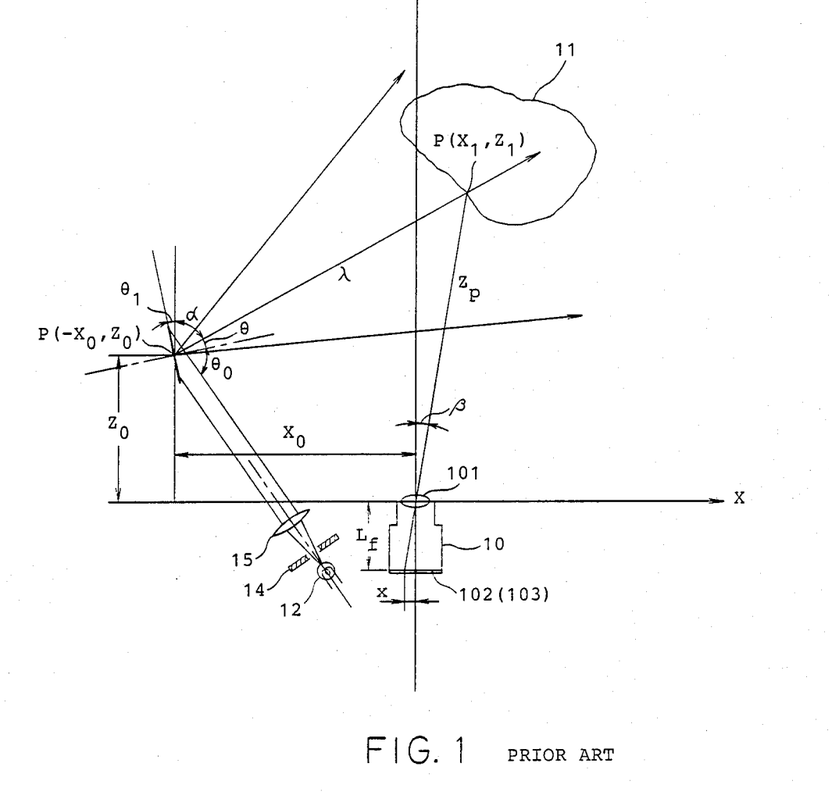
FIG. 1 is a pictorial view of a range finder and an object for use in describing a conventional distance information obtaining device.
Figure 2:
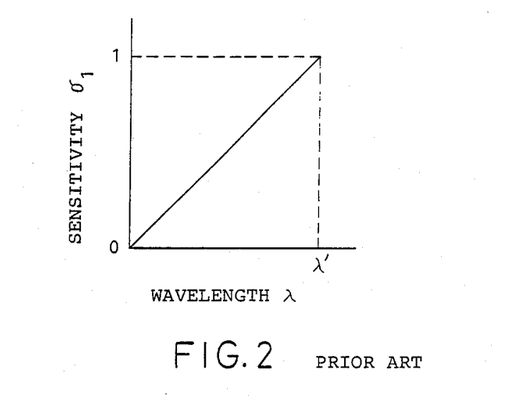
FIG. 2 is a graphical representation for use in describing a first spectral sensitivity of a first photoelectric transducer used for an image pickup device shown in FIG. 1.
Figure 3:
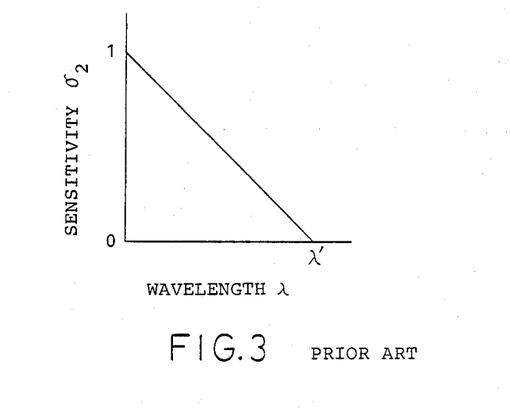
FIG. 3 is a graphical representation for use in describing a second spectral sensitivity of a second photoelectric transducer used for the image pickup device shown in FIG. 1.

Referring to FIGS. 1, 2, and 3, a conventional distance information obtaining device will be described at first in order to facilitate an understanding of the present invention. The conventional distance information obtaining device is a range finder of the type described in the article referred to hereinabove. The range finder is used in dealing with an object by a robot arm or a magic hand.

The range finder comprises an image pickup device 10, such as a television camera, having a pickup axis and a processing unit (not shown). The object has a position and is depicted at 11. The range finder is used in sensing a distance which will presently be more precisely defined between the image pickup device 10 and the object 11. Attention will be directed to a specific point P on the object 11.

On sensing the distance, the image pickup device 10 is directed towards the object 11. More particularly, a z-axis Z is selected in coincidence with the pickup axis. A coordinate plane is defined by the z-axis Z and the specific point P. The image pickup device 10 comprises a light receiving lens 101 at which an x-axis X is defined on the coordinate plane perpendicular to the z-axis Z. The axes X and Z define an origin at a center point of the light receiving lens 101. The specific point P has coordinates $(X_1, Z_1)$ and will be denoted by $P(X_1, Z_1)$.

The light receiving lens 101 has a focal length $L_f$. First and second photoelectric transducers 102 and 103 (the second photoelectric transducer 103 being later illustrated) are arranged perpendicular to the z-axis Z at a spacing of the focal length $L_f$ from the origin. Each of the first and the second photoelectric transducers 102 and 103 comprises a plurality of unit cells which are linearly aligned parallel to the x-axis X. The unit cells of the first photoelectric transducer 102 correspond to the respective unit cells of the second photoelectric transducer 103. The first and the second photoelectric transducers 102 and 103 have first and second spectral sensitivities $\sigma_1(\lambda)$ and $\sigma_2(\lambda)$ which are different from each other.

An optical beam is emitted from a light source 12 towards a diffraction grating 13 successively through a slit 14 and a collimeter lens 15. The grating 13 has a center point having coordinates $(-X_0, Z_0)$ denoted by $P(-X_0, Z_0)$ and has a normal which is directed to the object 11 and depicted by a dash-dot line. The grating 13 therefore forms a grating angle $\theta_1$ with the z-axis Z and directs diffracted light to the object 11 with a spectral distribution so that each point of the object 11 is exposed to a monochromatic beam of a wavelength $\lambda$. The monochromatic beam reaches the specific point $P(X_1, Z_1)$ forming a beam angle $\theta$ with the normal of the grating 13 and a first angle $\alpha$ with the z-axis Z.

Towards the image pickup device 10, the specific point $P(X_1, Z_1)$ reflects the monochromatic beam as a reflected beam which forms a second angle $\beta$ with the z-axis Z. In the image pickup device 10, the reflected beam falls on a specific unit cell of each of the first and the second photoelectric transducers 102 and 103. It will be assumed that the specific unit cell is positioned at a cell distance x from the z-axis Z.

In the manner described above, it is necessary for the range finder to sense the distance between the image pickup device 10 and the object 11. The distance is that between the origin and the specific point $P(X_1, Z_1)$ and will be denoted by $Z_p$. The distance $Z_p$ has a z distance component $Z_1$ given by:

$$Z_1 = (X_0 - Z_0 \tan\alpha)/(\tan\beta - \tan\alpha), \tag{1}$$

where the first angle $\alpha$ is calculated by using the grating angle $\theta_1$ and the beam angle $\theta$. The second angle $\beta$ is calculated by using the cell distance x and the focal length $L_f$. The distance $Z_p$ has an x distance component $X_1$ given by:

$$X_1 = \tan\beta \cdot (X_0 - Z_0 \tan\alpha)/(\tan\beta - \tan\alpha). \tag{1'}$$

It is, however, necessary on calculating the first angle $\alpha$ to preliminarily calculate the beam angle $\theta$. In order to know the beam angle $\theta$, the wavelength $\lambda$ is searched at first by using the reflected beam. More specifically, the first and the second photoelectric transducers 102 and 103 produce picture signals of first and second levels $I_1$ and $I_2$ in response to the reflected beam. The first and the second levels $I_1$ and $I_2$ have a level rate R defined and given by:

$$\begin{aligned} R &= I_1/(I_1 + I_2) \\ &= \sigma_1(\lambda)/[\sigma_1(\lambda) + \sigma_2(\lambda)]. \end{aligned} \tag{2}$$

It is therefore possible to search the wavelength $\lambda$ by using the level rate R provided that the spectral sensitivity $\sigma_1(\lambda)$ or $\sigma_2(\lambda)$ is a monotone function of the wavelength $\lambda$. In the example being illustrated, the first spectral sensitivity $\sigma_1(\lambda)$ is a monotonously increasing function illustrated in FIG. 2. The second spectral sensitivity $\sigma_2(\lambda)$ is a monotonously decreasing function illustrated in FIG. 3. In FIGS. 2 and 3, the abscissa and the ordinate represent the wavelength and the spectral sensitivity, respectively. The beam angle $\theta$ is now calculated according to:

$$\sin\theta_0 - \sin\theta = \pm n\lambda/d, \tag{3}$$

where $\theta_0$ represents an incident angle of the optical beam on the grating 13, d represents the grating constant, and n represents a natural number which represents the order of diffraction and is usually equal to unity.

It is now understood that the distance $Z_p$ is calculated by the processing unit by using the distances $X_1$ and $Z_1$ calculated by using the first and the second angles $\alpha$ and $\beta$ and the beam angle $\theta$ as a set of initial values. The beam angle $\theta$ is obtained by using two optical images which the specific point $P(X_1, Z_1)$ produces on the first and the second photoelectric transducers 102 and 103. The processing unit calculates the distances for various other points on the object 11. The processing unit of the type described is also proposed by Johji Tajima, the instant applicant, in Japanese Unexamined Patent Prepublication or Kôkai No. Syô 61-75210, namely, 75210/86.

As is obvious from the above, it is necessary with the conventional distance information obtaining device to sense the distance in a plurality of steps. A first step is for determining the wavelength according to Equation (2). A second step is for deciding the beam angle in compliance with Equation (3). A third step is for obtaining the distance information in accordance with Equation (1).

Furthermore, it is necessary to correctly measure the first and the second spectral sensitivities $\sigma_1(\lambda)$ and $\sigma_2(\lambda)$, relation between the beam angle $\theta$ and the first angle $\alpha$, relation between the cell distance x and the second angle $\beta$, and the coordinate $(X_0, Z_0)$. Moreover, if the image pickup device 10 or the grating 13 is changed to a new image pickup device or grating, it is necessary to measure the first and the second angles $\alpha$ and $\beta$, and the coordinates $(X_0, Z_0)$.

Figure 4:
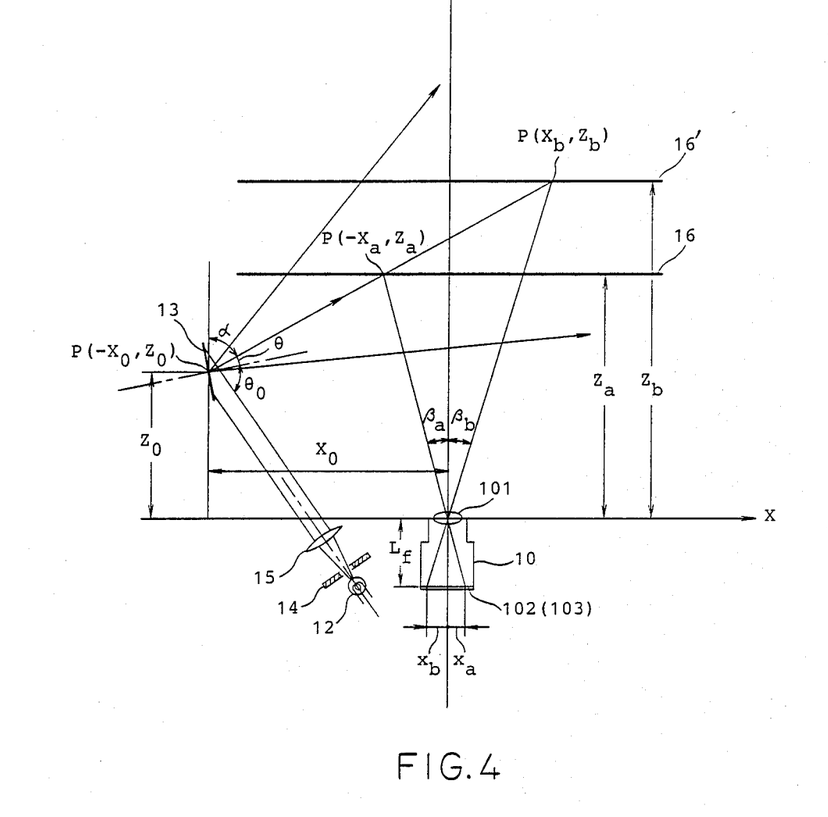
FIG. 4 is a pictorial view of the range finder operable as a part of a distance information obtaining device according to an embodiment of this invention for use in describing a preliminary process of the embodiment.
Figure 5:
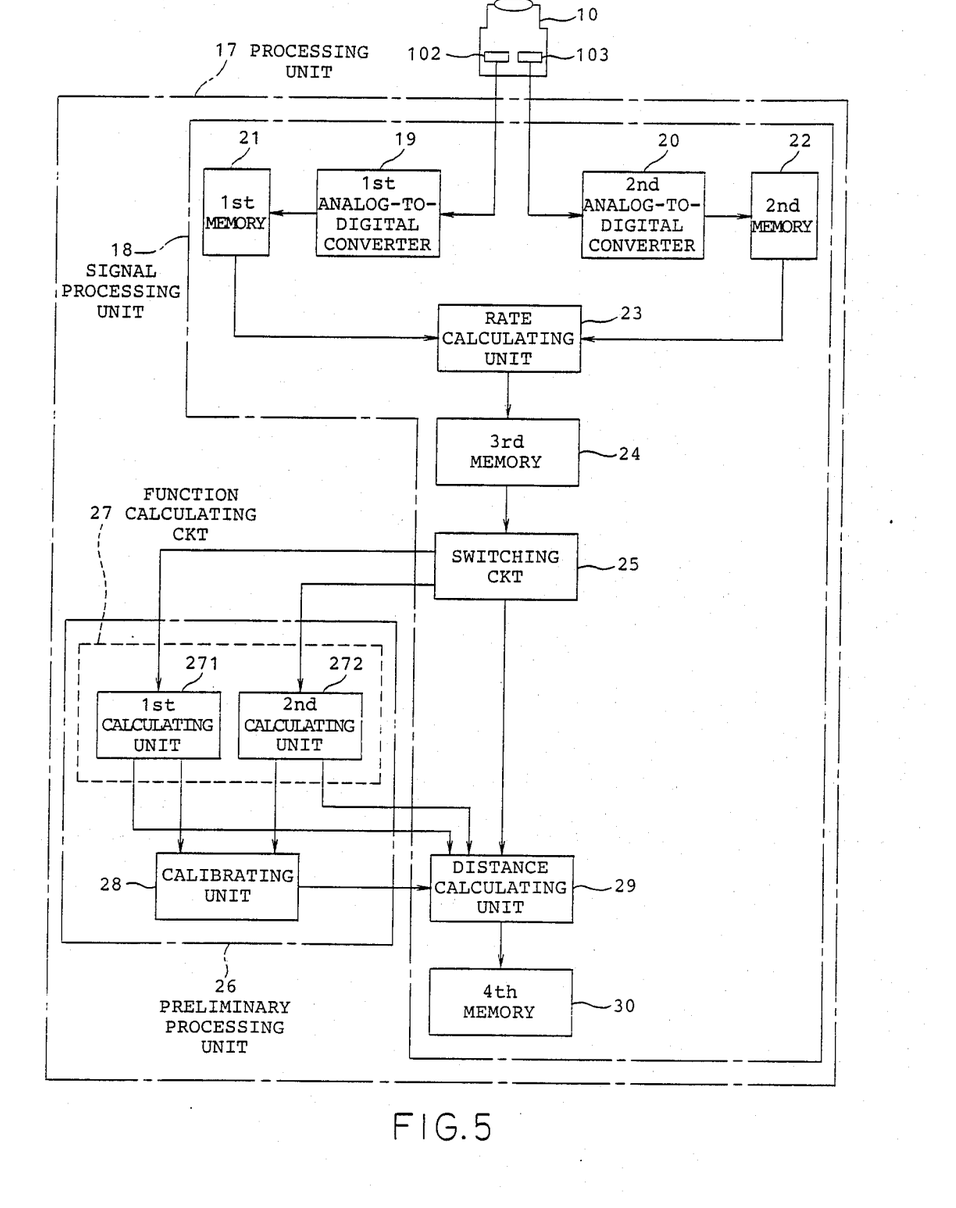
FIG. 5 is a block diagram of an image pickup device and a processing unit operable as a part of the distance information obtaining device of the embodiment.

Referring to FIGS. 4 and 5, the description will proceed to a distance information obtaining device according to an embodiment of this invention.

In the distance information obtaining device, a preliminary process is carried out previous to obtaining distance information. The preliminary process is for picking up first and second reference optical images of first and second reference plates as will presently be described.

In FIG. 4, the distance information obtaining device comprises a range finder which is similar to that illustrated with reference to FIG. 1 and comprises similar parts designated by like reference numerals. Description will therefore be made as regards the coordinate plane described in conjunction with FIG. 1.

In the preliminary process, a white plate 16 is located at first at a first distance $Z_a$ from the origin perpendicularly of the z-axis Z. The white plate 16 may be called a first reference plate. From the grating 13, the monochromatic beam is projected onto a primary point denoted by $P(-X_a, Z_a)$ of the white plate 16 with a first angle $\alpha$ formed with the z-axis Z. The monochromatic beam is reflected towards the image pickup device 10 as a reflected beam which forms a second primary angle $\beta_a$ with the z-axis Z. The reflected beam of the second primary angle $\beta_a$ falls on a unit cell that is placed in each of the first and the second photoelectric transducers 102 and 103 at a primary cell distance $x_a$ from the z-axis z. The first and the second photoelectric transducers 102 and 103 produce first and second reference picture signals, respectively, in response to the reflected beam. Each of the first and the second reference picture signals comprises a plurality of picture elements and has first and second reference levels $I_{11}$ and $I_{12}$ for each picture element according to the first and the second spectral sensitivities. Each of the first and the second reference picture signals is processed by a processing unit which will later be illustrated and described in detail.

Next, the white plate 16 is displaced to a position which has a second distance $Z_b$ from the origin. After displacement, the white plate is depicted at 16' in FIG. 2 and may be called a second reference plate.

The monochromatic beam is projected onto a secondary point denoted by $P(X_b, Z_b)$ of the white plate 16' with the first angle $\alpha$ formed with the z-axis Z. Towards the image pickup device 10, the monochromatic beam is reflected as the reflected beam which forms a second secondary angle $\beta_b$ with the z-axis Z. The reflected beam of the second secondary angle $\beta_b$ falls on the unit cell that is placed in each of the first and the second photoelectric transducers 102 and 103 at a secondary cell distance $x_b$ from the z-axis Z. The first and the second photoelectric transducers 102 and 103 produce third and fourth reference picture signals. Each of the third and the fourth reference picture signals has third and fourth reference levels $I_{21}$ and $I_{22}$ and is processed by the processing unit as will later be described.

In FIG. 5, the processing unit is depicted at 17 and is for processing the first through the fourth reference picture signals. The processing unit 17 comprises a signal processing unit 18. When the optical image of the white plate 16 is picked up by the image pickup device 10, first and second analog-to-digital converters 19 and 20 are supplied with the first and the second reference picture signals produced from the first and the second photoelectric transducers 102 and 103, respectively. The first and the second reference picture signals are converted into first and second reference digital signals for each picture element by the first and the second analog-to-digital converters 19 and 20, respectively.

The first and the second reference digital signals are stored in first and second memories 21 and 22 as first and second memorized reference digital signals, respectively.

A rate calculating unit 23 reads the first and the second memorized reference digital signals out of the first and the second memories 21 and 22 and calculates a first reference level rate $R_1$ according to Equation (2) for each picture element. The rate calculating unit 23 delivers a first reference level rate signal representative of the first reference level rates to a third memory 24. The rate calculating unit 23 serves as a first calculating unit. The third memory 24 memorizes the first reference level rate signal as a first memorized rate signal. In the manner described above, the third and the fourth reference picture signals produced by the first and the second photoelectric transducers 102 and 103 are processed by the first and the second analog-to-digital converters 19 and 20, the first and the second memories 21 and 22, and the rate calculating unit 23. Having dealt with the third and the fourth reference picture signals, the rate calculating unit 23 delivers a second reference level rate signal representative of a second reference level rate $R_2$ to the third memory 24. The third memory 24 memorizes the second reference level rate signal as a second memorized rate signal.

Figure 6:
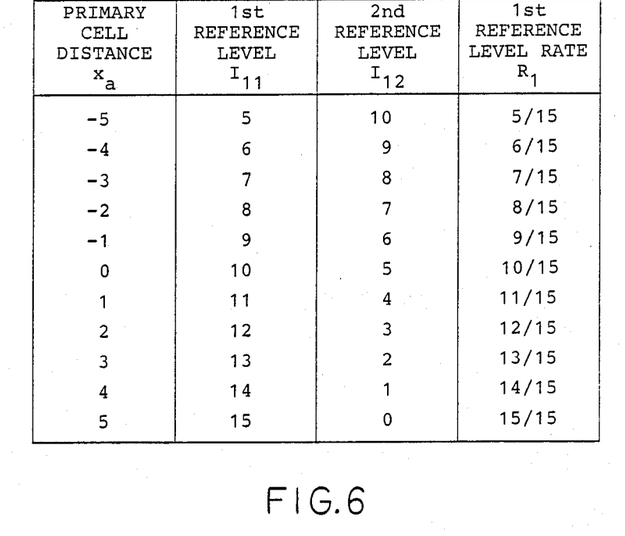
FIG. 6 is a diagram for use in describing operation of a first calculating unit illustrated in FIG. 5.
Figure 7:
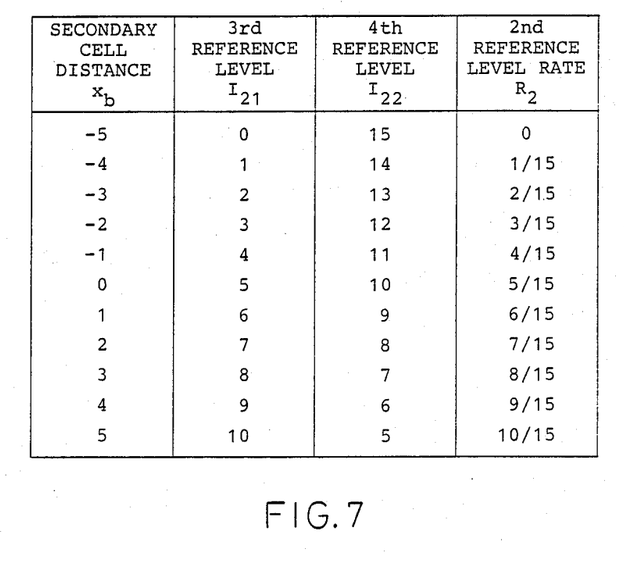
FIG. 7 is a diagram for use in describing operation of a second calculating unit illustrated in FIG. 5.

Turning to FIGS. 6 and 7 for a short while, attention will be directed to eleven unit cells in each of the first and the second photoelectric transducers 102 and 103 on describing operation of the rate calculating unit 23. One of the eleven unit cells receives a monochromatic beam reflected by the white plate 16 or 16' along the z-axis Z. The unit cell has zero (0) as each of the primary and the secondary cell distances $x_a$ and $x_b$. The eleven unit cells have from minus five to plus five as each of the primary and the secondary cell distances $x_a$ and $x_b$. An arbitrary scale will be used on measuring the first through the fourth reference levels $I_{11}$, $I_{12}$, $I_{21}$, and $I_{22}$.

In FIG. 6, the first reference level $I_{11}$ varies from five (5) up to fifteen (15) and the second reference level $I_{12}$, from ten (10) down to zero (0). According to Equation (2), the first reference level rate $R_1$ of the first memorized rate signal varies from 5/15 to 15/15 and will be called a first rate range.

In FIG. 7, the third reference level $I_{21}$ varies from zero (0) up to ten (10) and the fourth reference levels $I_{22}$, from fifteen (15) down to five (5). According to Equation (2), the second reference level rate $R_2$ of the second memorized rate signal varies from 0 to 10/15 and will be called a second rate range. It is to be noted here that the first reference level rate $R_1$ is equal to the second reference level rate $R_2$ within a range from 5/15 to 10/15. The range will be called an overlapping rate range.

Turning back to FIG. 5, a switching circuit 25 is used to make a preliminary processing unit 26 read the first and the second memorized rate signals out of the third memory 24 and separately processes the first and the second memorized rate signals in the manner described hereinafter. The first and the second memorized rate signal collectively serve as a reference signal. In the preliminary process, a circuit including the image pickup device 10 and the rate calculating unit 23, therefore, serve as a reference signal generating unit. The preliminary processing unit 26 comprises a function calculating circuit 27 comprising first and second calculating units 271 and 272 and a calibrating unit 28.

Attention will be directed to Equation (1) with regard to the white plate 16. Equation (1) is replaced by:

$$Z_a = (X_0 - Z_0 \cdot \tan\alpha)/(\tan\beta_a - \tan\alpha), \qquad (4)$$

because the white plate 16 is located at the first distance $Z_a$ from the origin. The first angle $\alpha$ may be regarded as a function of the reference level rate R. In the first photoelectric transducer 102 of the image pickup device 10, the primary cell distance $x_a$ from the z-axis Z is given by:

$$x_a = L_f \tan\beta_a. \qquad (5)$$

The primary cell distance $x_a$ is also represented by a first function $x_a(R)$ in relation to the first reference level rate $R_1$. According to Equations (4) and (5), the first function $x_a(R)$ is given by:

$$x_a(R) = L_f \{[X_0 - Z_0 \cdot \tan\alpha(R)]/Z_a + \tan\alpha(R)\}.$$

With regard to the white plate 16', the secondary cell distance $x_b$ is represented by a second function $x_b(R)$ in relation to the second reference level rate $R_2$. By the reason described above, the second function $x_b(R)$ is given by:

$$x_b(R) = L_f \{[X_0 - Z_0 \cdot \tan\alpha(R)]/Z_b + \tan\alpha(R)\}.$$

In FIG. 5, the first and the second calculating units 271 and 272 are for calculating the first and the second functions $x_a(R)$ and $x_b(R)$ in response to the first and the second memorized rate signals, respectively. Although each of the first and the second calculating units 271 and 272 immediately delivers a first function signal represented by the first function $x_a(R)$ and a second function signal represented by the second function $x_b(R)$ to the calibrating unit 28, a distance calculating unit 29 is supplied with the first and the second function signals on carrying out a measuring process as will later be described. In other words, each of the first and the second calculating units 271 and 272 temporarily memorizes the first and the second function signals.

Description will proceed to operation of the calibrating unit 28.

The calibrating unit 28 is for calibrating the distances $X_0$ and $Z_0$ of the center point $P(-X_0, Z_0)$ of the diffraction grating 13 from the first and the second reference level rates $R_1$ and $R_2$ by using a least square method.

Returning to FIG. 4, the diffraction grating 13 receives the optical beam from the light source 12 and emits diverging monochromatic beams with different wavelengths in different directions. It will now be assumed that each of the diverging monochromatic beams is emitted from the center point $P(-X_0, Z_0)$. Attention will be directed to a specific monochromatic beam that has a specific wavelength and falls on the white plate 16 at the primary point $P(-X_a, Z_a)$ and on the white plate 16' at the secondary point $(X_b, Z_b)$. The specific monochromatic beam proceeds along a straight line passing the three points $P(-X_0, Z_0)$, $P(-X_a, Z_a)$, and $P(X_b, Z_b)$.

It will be assumed that the straight line is given by:

$$Z = a_1 X + b_1,$$

where $a_1$ and $b_1$ represent a slope relative to the x-axis X and an intercept of the z-axis Z. That is:

$$a_1 = (Z_b - Z_a)/(X_a + X_b),$$

and $$b_1 = Z_b \cdot (Z_b - Z_a)/(X_a + X_b),$$

where $X_a = Z_a \cdot x_a / L_f$ and $X_b = Z_b \cdot x_b / L_f$.

Since the first and the second distances $Z_a$ and $Z_b$, and the focal length $L_f$ are preliminarily given and the primary and the secondary cell distances $x_a$ and $x_b$ can be obtained from the first and the second reference level rates $R_1$ and $R_2$ as described above, the slope $a_1$ and the intercept $b_1$ can be obtained. That is, the equation representative of the straight line can be calculated from the first and the second reference level rates $R_1$ and $R_2$ for the specific monochromatic beam.

The monochromatic beams emitted from the diffraction grating 13 are generally represented by the following linear equation:

$$Z = a_R X + b_R,$$

where $a_R$ represents slopes similar to the slope $a_1$ and $b_R$ represents intercepts like the intercept $b_1$.

The slopes $a_R$ and the intercepts $b_R$ can be calculated from the first and the second reference level rates $R_1$ and $R_2$ for the individual monochromatic beams in the manner similar to calculation of the slope $a_1$ and the intercept $b_1$.

When the slopes $a_R$ and the intercepts $b_R$ are obtained, the distances $X_0$ and $Z_0$ can be calculated according to the least square method as follows:

$$X_0 = \frac{\left(\sum_R \frac{1}{a_R^2 + 1}\right)\left(\sum_R \frac{a_R b_R}{a_R^2 + 1}\right) - \left(\sum_R \frac{a_R}{a_R^2 + 1}\right)\left(\sum_R \frac{b_R}{a_R^2 + 1}\right)}{\left(\sum_R \frac{a_R}{a_R^2 + 1}\right)^2 - \left(\sum_R \frac{1}{a_R^2 + 1}\right)\left(\sum_R \frac{a_R^2}{a_R^2 + 1}\right)}, \qquad (6)$$

and $$Z_0 = \frac{\left(\sum_R \frac{a_R b_R}{a_R^2 + 1}\right)\left(\sum_R \frac{a_R}{a_R^2 + 1}\right) - \left(\sum_R \frac{b_R}{a_R^2 + 1}\right)\left(\sum_R \frac{a_R^2}{a_R^2 + 1}\right)}{\left(\sum_R \frac{a_R}{a_R^2 + 1}\right)^2 - \left(\sum_R \frac{1}{a_R^2 + 1}\right)\left(\sum_R \frac{a_R^2}{a_R^2 + 1}\right)}. \qquad (7)$$

In the example being illustrated, the calculation of the distances $X_0$ and $Z_0$ is carried out with reference to the overlapping rate range described in conjunction with FIGS. 6 and 7. Each of the first and the second distances $Z_a$ and $Z_b$ is predetermined at 200 and 300 millimeters. The focal length $L_f$ has fifteen in cell distances.

Figure 8:
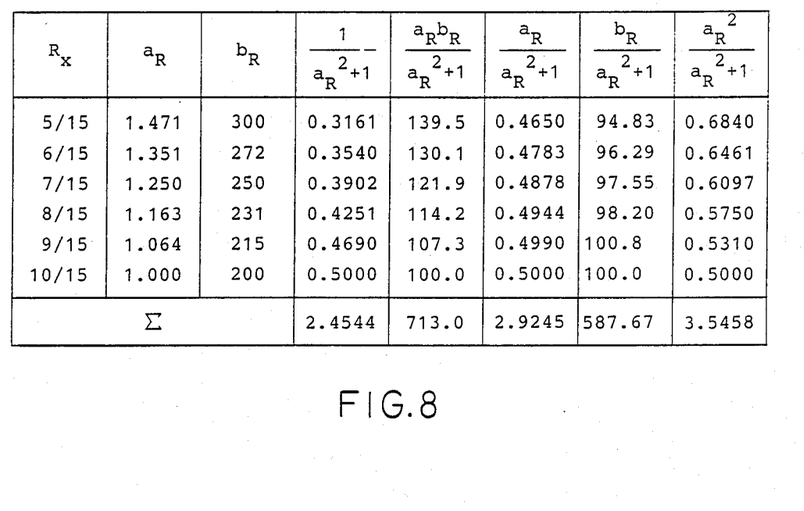
FIG. 8 is a diagram for use in describing operation of a calibrating unit illustrated in FIG. 5.

Referring to FIG. 8, each of the distances $X_0$ and $Z_0$ is calculated as $-208.8$ and $-9.4$ millimeters as a result of the calculation according to Equations (6) and (7).

In FIG. 5, the calibrating unit 28 is for carrying out calculation described above in accordance with the first and the second functions $x_a(R)$ and $x_b(R)$. The calibrating unit 28 may therefore be called a second calculating unit. The calibrating unit 28 delivers a calculation result signal representative of the distances $X_0$ and $Z_0$ to a distance calculating unit 29 on the measuring process.

Description will proceed to the measuring process.

In the measuring process, the image pickup device 10 is directed to the object 11 (FIG. 1). From the grating 13, the diverging monochromatic beams are projected onto the object 11. One of the monochromatic beams falls on the specific point $P(X_1, Z_1)$ as a particular monochromatic beam that forms the first angle $\alpha$ with the z-axis Z. The particular monochromatic beam is reflected as the reflected beam towards the image pickup device 10 with the second angle $\beta$ formed with the z-axis Z. The first and the second photoelectric transducers 102 and 103 produce first and second object picture signals, respectively. Each of the first and the second object picture signals has first and second levels $I_1$ and $I_2$ for each picture element. In the manner described above, the first and the second object picture signals are processed by the first and the second analog-to-digital converters 19 and 20, the first and the second memories 21 and 22, and the rate calculating unit 23. The rate calculating unit 23 delivers a level rate signal to the third memory 24. The level rate signal has a level rate $R_x$. The third memory 24 memorizes the level rate signal as a memorized level rate signal.

The distance calculating unit 29 reads the memorized level rate signal out of the third memory 24 through the switching circuit 25. The distance calculating unit 29 reads one of the first and the second function signals and the calculation result signal out of the function calculating circuit 27 and the calibrating unit 28, respectively. By using one of the first and the second function signals and the calculation result signal, the distance calculating unit 29 carries out a predetermined calculation as will presently be described.

It will be assumed that the particular monochromatic beam falls on the unit cell that is placed in each of the cell distance x from the z-axis Z as described in conjunction with FIG. 1. The distance component $Z_1$ is given by:

$$Z_1 = (Z_a - Z_0) \cdot (X_1 - X_0)/(X_a - X_0) + Z_0.$$

On the other hand, the cell distance x is given by:

$$x = L_f \tan\beta = L_f X_1/Z_1.$$

The distance component $Z_1$ is therefore equal to:

$$Z_1 = (Z_0 \cdot X_a - Z_a \cdot X_0) \cdot L_f / [(X_a - X_0) \cdot L_f - (Z_a - Z_0) \cdot x]. \quad (8)$$

By using the coordinates $(X_b, Z_b)$ instead of the coordinate $(X_a, Z_a)$, the distance $Z_1$ is given also by:

$$Z_1 = (Z_0 \cdot X_b - Z_b \cdot X_0) \cdot L_f / [(X_b - X_0) \cdot L_f - (Z_b - Z_0) \cdot x]. \quad (9)$$

In addition, the distance calculating unit 29 selects one of Equations (8) and (9) in accordance with the level rate $R_x$ of the level rate signal. In other words, the distance calculating unit 29 selects one of the first and the second reference level rate ranges which include the level rate $R_x$. This means that the distance information obtaining device is capable of obtaining the distance information with a wide range.

Figure 9:
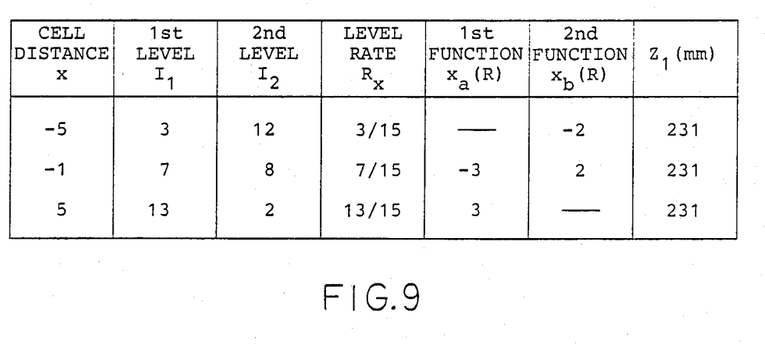
FIG. 9 is a diagram for use in describing operation of a distance calculating unit illustrated in FIG. 5.

Reference will be had afresh to FIG. 9 and again to FIGS. 6 and 7. When the level rate $R_x$ on the cell distance of minus five is equal to three-fifteenth (3/15), the distance $Z_1$ is calculated as 231 millimeters according to Equation (9) because the level rate $R_x$ is included only in the second rate range shown in FIG. 7 and corresponds to the second function $x_b(R)$ of minus two. When the level rate $R_x$ on the cell distance of minus one is equal to seven-fifteenth (7/15), the distance $Z_1$ is calculated as 231 millimeters according to Equation (8) or Equation (9) because the level rate $R_x$ is included in both of the first and the second rate ranges shown in FIGS. 6 and 7 and corresponds to the first function $x_a(R)$ of minus three and the second function $x_b(R)$ of two, respectively. When the level rate $R_x$ on the cell distance of five is equal to thirteen-fifteenth (13/15), the distance $Z_1$ is calculated as 231 millimeters according to Equation (8) because the level rate $R_x$ is included only the first rate range shown in FIG. 6 and corresponds to the first function $x_a(R)$ of minus three.

In the manner described above, it is to be noted that the primary and the secondary cell distances $x_a$ and $x_b$ are regarded as the first and the second distances $X_a$ and $X_b$, respectively, on carrying out the calculation according to Equations (8) and (9). The first distance $X_a$ is, however, calculated by:

$$X_a = x_a \cdot Z_a / L_f.$$

The second distance $X_b$ is calculated by:

$$X_b = x_b \cdot Z_b / L_f.$$

Next, the distance calculating unit 29 calculates the distance component $X_1$ according to:

$$X_1 = (X_0 \cdot Z_a - X_a \cdot Z_0)/[Z_a - Z_0 - (X_a - X_0) \cdot L_f / x],$$

and $$X_1 = (X_0 \cdot Z_b - X_b \cdot Z_0)/[Z_b - Z_0 - (X_b - X_0) \cdot L_f / x].$$

Furthermore, the distance calculating unit 29 calculates the distance $Z_p$ by using the distance components $Z_1$ and $X_1$ in the manner known in the art.

Thus, the distance calculating unit 29 calculates the distance for each picture element of the first and the second object picture signals and delivers a distance signal as a processed signal representative of distance information to a fourth memory 30.

As is obvious from the above, a distance information obtaining device is calibrated according to this invention by only twice carrying out image pickup operation. The calibration is unnecessary unless either or both of the image pickup device 10 and the diffraction grating 13 are changed to new ones.

Although the description of the embodiment is made as regards a two-dimensional coordinate plane defined by the x-axis X and the z-axis Z, the invention can be applied to a three-dimensional space by using first and second two-dimensional photoelectric transducers instead of the first and the second photoelectric transducers. Moreover, a y-axis Y is defined at the origin vertical to the coordinate plane described in conjunction with FIG. 4. Under the circumstances, each of the first and the second two-dimensional photoelectric transducers has a center point at a center thereof. The cell distance is represented by an x-component x and a y-component y. A first distance is calculated by using the x-component x of the cell distance in the manner described above. Similarly, a second distance is calculated by using the y-component y of the cell distance. The distance is calculated by using the first and the second distances in the manner known in the art.

While this invention has thus far been described in conjunction with a single preferred embodiment thereof, it will readily be possible for those skilled in the art to put this invention into practice in various other manners. For example, the first and the second calculating units 271 and 272 may be implemented by a single calculating unit by successively calculating the first and the second functions $x_a(R)$ and $x_b(R)$. The diffraction grating 13 may be implemented by another tight dispersing device such as a prism or the like. Each of the first and the second photoelectric transducers is arranged in parallel with the z-axis Z by using a mirror or the like.

What is claimed is:

1. In a distance information obtaining device for obtaining distance information related to a distance between a predetermined position and an object, said device comprising illuminating means for illuminating said object by a monochromatic beam, image pickup means located at said predetermined position for picking up an optical image of said object to produce a picture signal, and processing means coupled to said image pickup means for processing said picture signal to produce a processed signal, the improvement wherein said processing means comprises:

reference signal generating means for generating a reference signal;

preliminary processing means responsive to said reference signal for preliminarily processing said reference signal to produce a preliminary processed signal; and signal processing means responsive to said preliminary processed signal and said picture signal for processing said picture signal with reference to said preliminary processed signal to make said processed signal which represents said distance information.

2. A distance information obtaining device as claimed in claim 1, said image pickup means comprising first and second transducing means each comprising a plurality of unit cells for transducing said optical image into first and second object picture signals to produce said first and said second object picture signals collectively as said picture signal, the unit cells of said first and said second transducing means having first and second spectral sensitivities which are different from each other, said first and said second object picture signals consisting of a plurality of picture elements by the respective unit cells of said first and said second transducing means and having first and second levels, said signal processing means comprising first calculating means responsive to said first and said second object picture signals for calculating a level rate of said first and said second levels for each of said picture elements to produce a level rate signal representative of said level rate, wherein:

said reference signal generating means is for generating said reference signal by using said image pickup means and said first calculating means;

said image pickup means picking up first and second reference optical images of a reference plate located at first and second distances from said predetermined position, said first and said second transducing means producing first and second reference picture signals derived from said first reference optical image and producing third and fourth reference picture signals derived from said second reference optical image;

said first calculating means calculating a first reference level rate in response to said first and said second reference picture signals and calculating a second reference level rate in response to said third and said fourth reference picture signals to produce first and second reference level rate signals collectively as said reference signal, each of said first and said second reference level rate signals being representative of said first and said second reference level rates in one to one correspondence to said unit cell.

3. A distance information obtaining device as claimed in claim 2, wherein said preliminary processing means comprises:

function calculating means for separately calculating first and second functions in response to said first and said second reference level rate signals, respectively, to produce first and second function signals as a part of said preliminary processed signal, each of said first and said second functions being for representing a position of said unit cell by using said first and said second level rates; and second calculating means coupled to said function calculating means for calculating a position of said illuminating means in response to said first and said second function signals to produce a calculation result signal as another part of said preliminary processed signal, said calculation result signal being representative of said position of said illuminating means;

said signal processing means further comprising third calculating means responsive to said level rate signal, one of said first and said second function signals and said calculation result signal for carrying out a predetermined calculation to produce said processed signal.

4. A processing unit for use in a distance measuring device which is for measuring an unknown distance between a predetermined position and each point on an object and comprises illuminating means at a predetermined distance from said predetermined position for illuminating said object by diverging monochromatic beams, a beam receiving lens located at said predetermined position and having an optical axis, and first and second transducers, each comprising a plurality of unit cells at a focal length of said beam receiving lens, the unit cells of said first transducer corresponding to the respective unit cells of said second transducer and having a first spectral sensitivity which is different from a second spectral sensitivity had by the unit cells of said second transducer, a particular set of corresponding unit cells of said first and said second transducers producing first and second elementary signals with a primary level rate upon reception through said beam receiving lens one of said monochromatic beams that is reflected at a particular point on said object, said processing unit including distance calculating means for calculating the unknown distance by using said primary level rate and said predetermined distance, wherein the improvement comprises:

reference signal producing means for making each set of the corresponding unit cells of said first and said second transducers produce first and second reference signals with a first secondary level rate and third and fourth reference signals with a second secondary level rate; and calibrating means coupled to said distance calculating means for calibrating said predetermined distance by supplying said first and said second secondary level rates.

* * * * *